United States Patent [19]

Petzinger

[11] 4,333,831
[45] Jun. 8, 1982

[54] EVAPORATION SEPTIC TANK SEWAGE SYSTEM

[76] Inventor: Manfred W. A. Petzinger, Rte. 7, Box 87, Elizabethtown, Ky. 42701

[21] Appl. No.: 219,036

[22] Filed: Dec. 22, 1980

[51] Int. Cl.³ .............................................. C02F 1/04
[52] U.S. Cl. .................................. 210/170; 210/199; 210/202; 210/218; 210/532.2; 159/1 RW
[58] Field of Search ................. 210/170, 532.2, 218, 210/747, 199, 200, 201, 202, 262; 55/257 R, 414; 159/1 RW, 31, 47 WL, DIG. 11

[56] References Cited

U.S. PATENT DOCUMENTS

| | | |
|---|---|---|
| 848,279 | 3/1907 | Ashley . |
| 1,415,007 | 5/1922 | Ball ........................................ 210/218 |
| 1,762,419 | 6/1930 | Pettis ...................................... 210/532.2 |
| 1,950,841 | 3/1934 | Crawford ............................. 210/532.2 |
| 2,213,458 | 9/1940 | Buckley ............................... 210/532.2 |
| 2,432,887 | 12/1947 | Haviland ............................ 210/532.2 |
| 3,036,627 | 5/1962 | Scharman . |
| 3,199,269 | 8/1965 | Oehlrich et al. ........................ 55/414 |
| 3,207,314 | 9/1965 | Pearson . |
| 3,229,749 | 1/1966 | Holmer . |
| 3,368,967 | 2/1968 | Weaver et al. . |
| 3,681,236 | 8/1972 | Bergles et al. . |
| 3,698,194 | 10/1972 | Flynn . |
| 3,721,346 | 3/1973 | Lore et al. . |
| 3,724,664 | 4/1973 | Lemberger et al. . |
| 3,762,549 | 10/1973 | Crampton . |
| 3,776,383 | 12/1973 | Hargraves ........................... 210/218 |
| 3,817,858 | 6/1974 | Yost . |
| 3,859,215 | 1/1975 | Milne . |
| 3,864,252 | 2/1975 | Morin et al. . |
| 3,879,285 | 4/1975 | Yost . |
| 3,907,679 | 9/1975 | Yost . |
| 4,039,451 | 8/1977 | Smith . |
| 4,252,649 | 2/1981 | Favret, Jr. ........................... 210/170 |

FOREIGN PATENT DOCUMENTS 2024794  1/1980  United Kingdom ............... 210/218

Primary Examiner—Benoit Castel
Attorney, Agent, or Firm—Darrell E. Hollis

[57] ABSTRACT

An improved apparatus for treatment of sewage is disclosed in which the overflow fluid sewage from a septic tank is directed into at least one enclosed evaporation tank having at least one upwardly extending vapor stack. A conduit may be provided for introducing a flow of air into the evaporation tank thereby facilitating evaporation of the fluid sewage. Return flow of condensate from the vapor stack into the evaporation tank is prevented by a baffle member and drain conduit operatively associated with the vapor stack.

6 Claims, 3 Drawing Figures

EVAPORATION SEPTIC TANK SEWAGE SYSTEM

FIELD OF THE INVENTION

The present invention relates in general to an apparatus for treating fluent sewage of the type ordinarily discharged from a dwelling into a sewage treatment facility. More particularly, the present invention relates to an apparatus for treating such fluent sewage utilizing evaporation technique.

DESCRIPTION OF THE PRIOR ART

Systems for treating and purifying domestically produced sewage have been known for many years. In addition to large municipal systems which receive sewage from a great number of dwellings and other structures, individual septic tank systems have been used in remote locations or in locations where municipal sewage treatment facilities have not been provided. In such septic tank systems, the fluent sewage leaving the dwelling is directed into a large holding or septic tank which typically is located below ground at a place relatively close to the dwelling. Solid waste settles to the bottom of the tank where it decomposes in the known manner. Overflow liquid waste and some suspended solid waste are permitted to leave the septic tank and flow into an underground network of porous pipes located in a drainage or disposal field. Here the overflow liquid waste flows or leaches out into the surrounding soil and, in theory, is disposed of in a sanitary manner.

Difficulties have been experienced with such septic and disposal field systems for many years. Especially where the soil of the disposal field is not sufficiently permeable to liquid, the field may become rather soggy due to the presence of the overflow liquid sewage and objectionable odors may be present. In some locations septic systems cannot be used at all for these reasons, or because the liquid sewage tends to move too far laterally and thus to pollute adjacent properties, or water supplies, or both.

Numerous attempts have been made to alleviate some aspects of these problems by permitting at least a portion of the overflow liquid sewage to evaporate before the remainder is discharged to the disposal field; however, such systems typically have required the use of fans or blowers to force air through the septic tank or auxiliary holding tanks, heaters to raise the temperature of the overflow liquid sewage and other complex components which have raised the initial cost and operating expenses of such systems considerably. Thus, a need has continued to exist for a passive sewage treatment system which would cause overflow liquid sewage to be evaporated efficiently without the need for auxiliary power to operate blowers or heating elements.

SUMMARY OF THE INVENTION

An object of the present invention is to provide an improved system for treatment of domestic sewage which eliminates or substantially reduces the need for a conventional drainage or disposal field of the type currently used in septic tank systems.

A further object of the invention is to provide such a system in which overflow liquid sewage from a conventional septic tank is evaporated in an additional evaporation tank, thereby substantially or totally eliminating any need for directing the fluid to a conventional drainage type network in a disposal field.

Still another object of the invention is to provide such a system in which the vapors produced by the overflow liquid sewage are directed to the atmosphere through a vapor stack which is configured to prevent the return to the evaporation tank of any condensate formed within the vapor stack itself.

A further object of the invention is to provide such a system in which vapor condensed after the evaporation tank is drawn off at a location convenient for collection and reuse, if desired.

Still another object of the invention is to provide an improved apparatus for treating overflow liquid sewage from a septic tank system in which the liquid is caused to evaporate within an enclosed tank so that release of the liquid sewage to the surrounding soil is no longer required.

These objects of the invention are given only by way of example. Thus, other desirable objectives and advantages inherently achieved by the disclosed apparatus may occur to those skilled in the art. Nonetheless, the scope of the invention is to be limited only by the appended claims. In accordance with the invention, fluent sewage is directed into a septic tank and any overflow liquid sewage from the septic tank is directed into at least one enclosed evaporation tank having an upwardly extending vapor stack. A flow of air preferably is introduced into the evaporation tank and any condensate formed in the vapor stack is prevented from returning into the enclosed tank so that evaporation of the overflow liquid sewage is accomplished.

The evaporation tank according to the invention comprises an enclosed volume which typically is installed below ground level, though above ground installations are also within the scope of the invention. A conduit is provided for directing a flow of sewage into the tank and at least one vapor stack extends upwardly from the upper portion of the tank. Means separate from the vapor stack such as an upwardly extending conduit preferably are provided for introducing a convective flow of air into the tank. Within the vapor stack, a baffle and condensate outlet are provided which prevent return flow of condensate from the vapor stack into the evaporation tank. In a preferred embodiment, the baffle comprises an upwardly angled annular plate which extends around the interior circumference of the vapor stack. Just above the upper side of the annular baffle, a conduit is provided for conveying condensate from the upper side to a point outside the vapor stack, where the condensate may be collected or allowed to flow away. To minimize release of offensive odors from the vapor stack through this conduit, a downwardly extending trap elbow is provided which usually remains full of condensate.

BEST MODE FOR CARRYING OUT THE INVENTION

Figure 1:
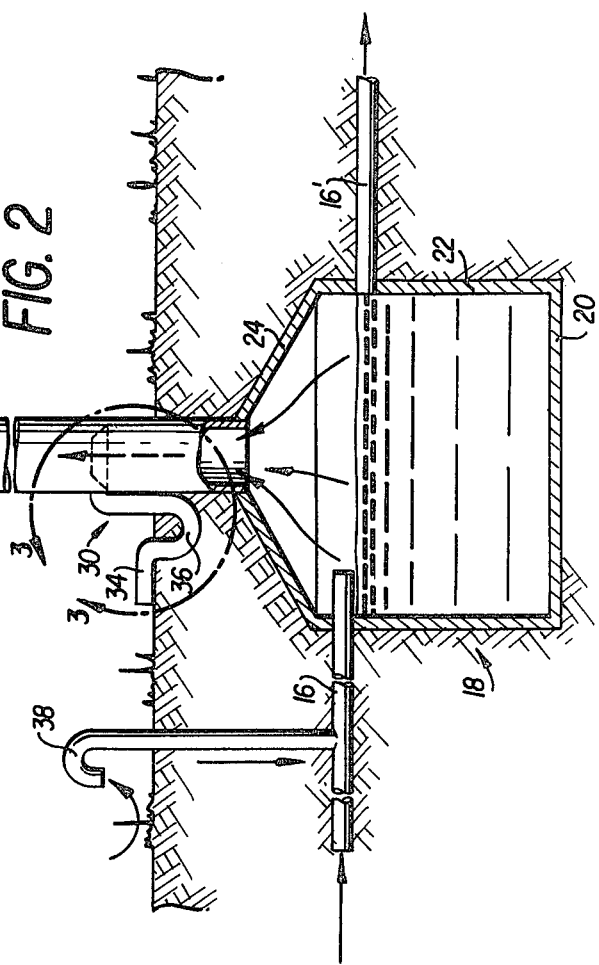
FIG. 1 shows a perspective view, partially broken away, of a sewage treatment system embodying the present invention.

The following is a detailed description of the preferred embodiment of the invention, reference being made to the drawings in which like reference numerals identify like elements of the structure in each of the several figures.

Figure 2:
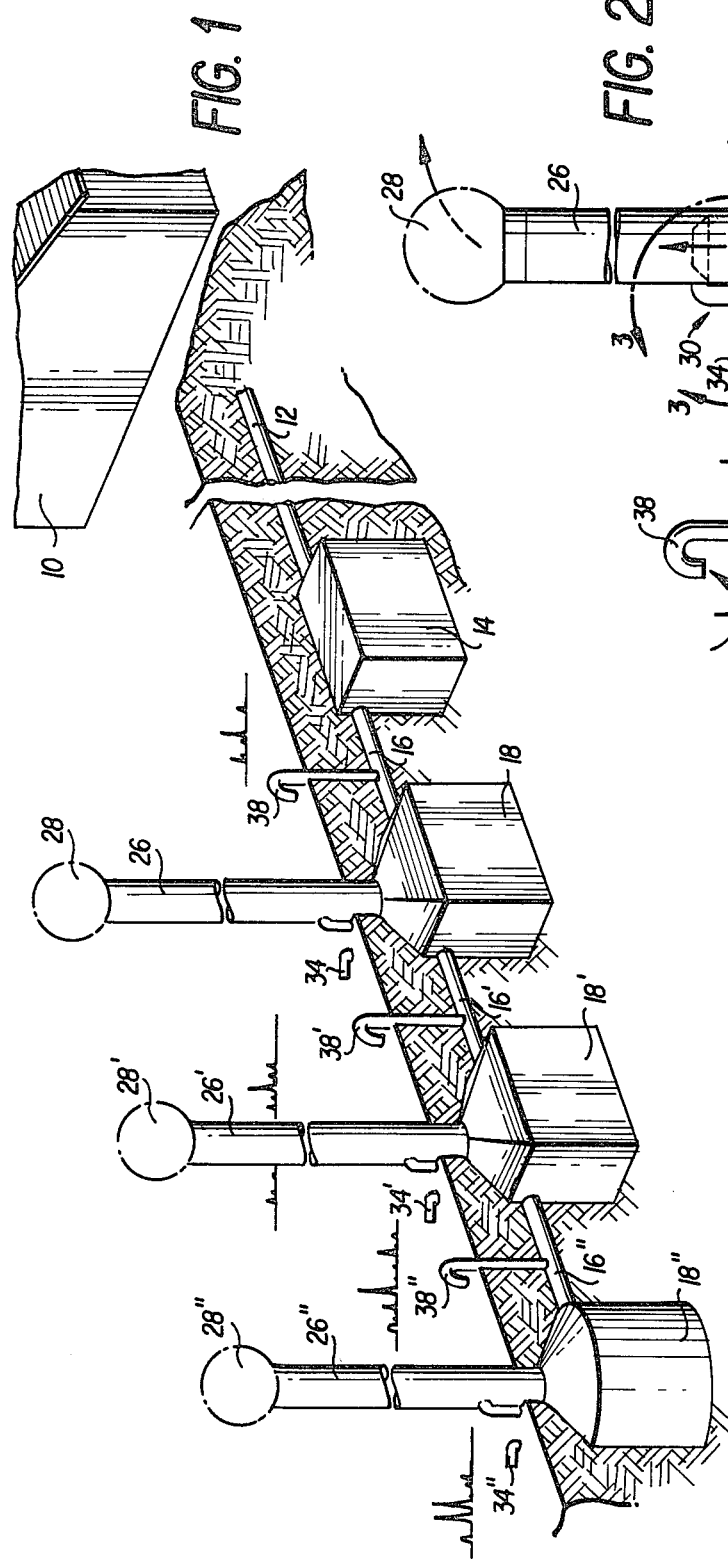
FIG. 2 shows a side elevation view, partially in section, of an evaporation tank according to the present invention.
Figure 3:
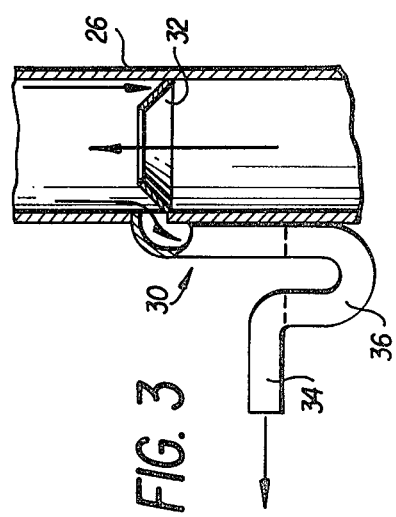
FIG. 3 shows a side elevation view, partially in section, of a baffle structure for preventing return flow of condensate down the inner wall of an upwardly extending vapor stack.

With reference simultaneously to FIGS. 1, 2 and 3, a building 10 such as a dwelling or other structure having conventional bathroom facilities is shown, from which fluent sewage is discharged via a main pipe 12. Such fluent sewage typically includes both solid and liquid portions which are directed to a conventional septic tank 14 where most of the solids settle out and eventually decompose. According to the invention, any overflow liquid sewage is directed from septic tank 14 through a conduit 16 into at least one evaporation tank 18, which preferably comprises water impervious bottom wall 20, side walls 22 and an upwardly converging top wall 24. As illustrated in FIG. 1, tank 18 may be rectangular or round or of any other convenient geometry, as desired. Septic tank 14 and tank 18 may be water impervious or not depending on local soil properties and ordinances, and may be made from any suitable material such as concrete, fiberglass or steel, for example. In the illustrated embodiment of the invention, a plurality of evaporation tanks are used, the liquid overflow from one evaporation tank being directed to the next through additional conduits 16' and 16''. The number of evaporation tanks for a given installation preferably is selected so that the final tank 18'' requires no liquid overflow conduit since all liquid is evaporated through vapor stacks 26, 26', 26''; however, a drainage field may be used as a precaution, if desired.

Vapor stack 26 extends upwardly from top wall 24, preferably near the center of the tank; however, it also could be located elsewhere in the upper portion of tank 18, such as along the upper edge of one of side walls 22. The top of stack 26 preferably is closed by means such as a conventional rotary ventilator 28 which prevents entry of rain and other material into the evaporation tank and also deflects condensate back down the inside wall of stack 26. As illustrated, evaporation tanks 18, 18', 18'' preferably are located below ground with their vapor stacks 26 projecting several feet above ground level, so that odors are carried off at a suitable altitude.

Just above ground level, a means 30 is provided for preventing return flow into tank 18 of any condensate formed on the inside walls of vapor stack 26. Preferably, means 30 comprises an upwardly angled, annular baffle 32 having a central opening through which vapors rising in stack 26 can easily pass. Condensate formed on the inside walls of stack 26 above baffle 32 flows back down the walls and collects above the upper side of baffle 32 before flowing into a condensate drain conduit 34. To prevent escape of odors from vapor stack 26 through drain conduit 34, a downwardly extending trap elbow 36 is provided which tends to fill with condensate as indicated in FIG. 3 and thus prevent flow of gases through conduit 34. The condensate leaving conduit 34 is relatively pure and may be collected for reuse, if desired. To prevent freezing, it is desirable to locate elbow 36 below the frost line.

Air may be drawn into the system via a plurality of air conduits 38, 38', 38'' extending upwardly from the conduits 16, 16', 16'' which direct the overflow liquid sewage into evaporation tanks 18, 18', 18''. Thus, as vapors rise from the liquid sewage into stack 26, air is drawn by convection into the evaporation tanks and, in general, across the surface of the overflow liquid sewage, promoting further evaporation. Operation without any conduits 38 or with fewer than one per evaporation tank is feasible, but the evaporation rate is slower.

In one actual installation, the entire sewage discharge from a dwelling which previously had a septic tank and a drainage field made up of approximately 100 feet of perforated pipe, was treated successfully using the same septic tank and a single 1000 gallon evaporation tank having an evaporation stack 4 inches in diameter and approximately 6 feet in height. In some instances where the volume of fluent sewage is rather small, a combination evaporation and septic tank may be used; however, it is preferred to use both a septic tank and an evaporation tank so that the disposition of solid and liquid wastes is handled separately.

In the embodiment shown in FIGS. 1 to 3, overflow liquid sewage from septic tank 14 is directed into evaporation tank 18 which eventually will fill with liquid sewage until flow through conduit 16' into evaporation tank 18' begins. Eventually, flow from evaporation tank 18' to evaporation tank 18'' will begin through conduit 16''. Within each evaporation tank, the liquid sewage evaporates and its vapors rise through vapor stack 26 while baffle 32 and drainage conduit 34 prevent return of condensate into the evaporation tank. Evaporation is possible even in colder weather, since most household effluent is rather warm due to the use of heated water. In addition, the decomposition of the solid waste adds some heat to the overflow liquid sewage before it reaches the evaporation tanks. While three evaporation tanks are illustrated and are thought to be sufficient to handle the treatment of sewage from a typical dwelling, those skilled in the art will realize that more or fewer evaporation tanks could be used depending upon the volume of sewage to be treated.

The present invention is particularly useful for treating sewage discharge from a private dwelling, without the need for a conventional discharge or drainage field. Although the system according to the invention preferably is disposed below ground, those skilled in the art will appreciate that the septic tank and evaporation tanks used in the invention could also be located above ground should conditions require. Moreover, by increasing the size of the various components, the sewage discharged by additional dwellings or larger dwelling structures can also be accommodated.

Obviously numerous modifications and variations of the present invention are possible in light of the above teachings. It is therefore to be understood that within the scope of the appended claims the invention may be practiced otherwise than as specifically described herein.

Having described my invention in sufficient detail to enable those skilled in the art to make and use it, I claim:

1. An improved apparatus for evaporating liquids from fluent sewage, comprising:
   a. a tank, having enclosing walls with an upwardly converging top wall;
   b. a first conduit for directing a flow of fluent sewage into said tank;
   c. a second conduit for directing overflow liquid sewage from said tank;
   d. a third conduit extending upwardly from said first conduit, whereby air is drawn through said tank by convection;

e. at least one vapor stack extending from an upper portion of said tank, said vapor stack being closed at its upper end with a rotary ventilator;

f. at least one upwardly angled baffle member extending around the interior perimeter of said at least one vapor stack thereby preventing return flow of condensate from said at least one vapor stack into said tank;

g. at least one fourth conduit, communicating with the interior of said vapor stack adjacent said baffle member, for conveying return condensate to a point outside said vapor stack, said fourth conduit comprising means for preventing flow of air from said vapor stack through said fourth conduit.

2. An improved system for treatment of fluent sewage, comprising:

a. at least one septic tank;

b. a first conduit for conveying fluent sewage to said at least one septic tank;

c. a second conduit for directing overflow liquid sewage from said at least one septic tank;

d. at least one evaporation tank having enclosed walls, including an upwardly converging top wall, connected to receive said overflow sewage from said second conduit;

e. third conduit for conveying overflow liquid sewage from said at least one evaporation tank to another, substantially identical evaporation tank;

f. a fourth conduit extending upwardly from said second conduit, whereby air is drawn through said at least one evaporation tank by convection;

g. at least one vapor stack extending from an upper portion of said at least one evaporation tank, said vapor stack being closed at its upper end with a rotary ventilator;

h. at least one upwardly angled baffle member extending around the interior perimeter of said at least one vapor stack thereby preventing return flow of condensate from said at least one vapor stack into said tank; and i. at least one fifth conduit, communicating with the interior of said vapor stack adjacent said baffle member, for conveying return condensate to a point outside said vapor stack, said fifth conduit comprising means for preventing flow of air from said vapor stack through fifth conduit.

3. Apparatus according to claim 2, wherein said means for preventing flow of air comprises a downwardly extending trap elbow in said fifth conduit.

4. Apparatus according to claim 2, wherein there are a plurality of evaporation tanks, the first such evaporation tank being connected to said second conduit, further comprising a corresponding plurality of additional conduits connecting the remaining such evaporation tanks in series after said first such evaporation tank, the last such evaporation tank in said series having no sewage outlet.

5. Apparatus according to claim 4, further comprising further means for introducing a flow of air into each of said plurality of evaporation tanks.

6. Apparatus according to claim 5, wherein said further means for introducing a flow of air comprises a plurality of conduits, one extending upwardly from each of said plurality of additional conduits, whereby air is drawn through said evaporation tanks by convection.

* * * * *